June 23, 1925.
N. TROYER
CAN BODY FORMING MACHINE
Filed Jan. 26, 1922
9 Sheets-Sheet 1
1,543,460
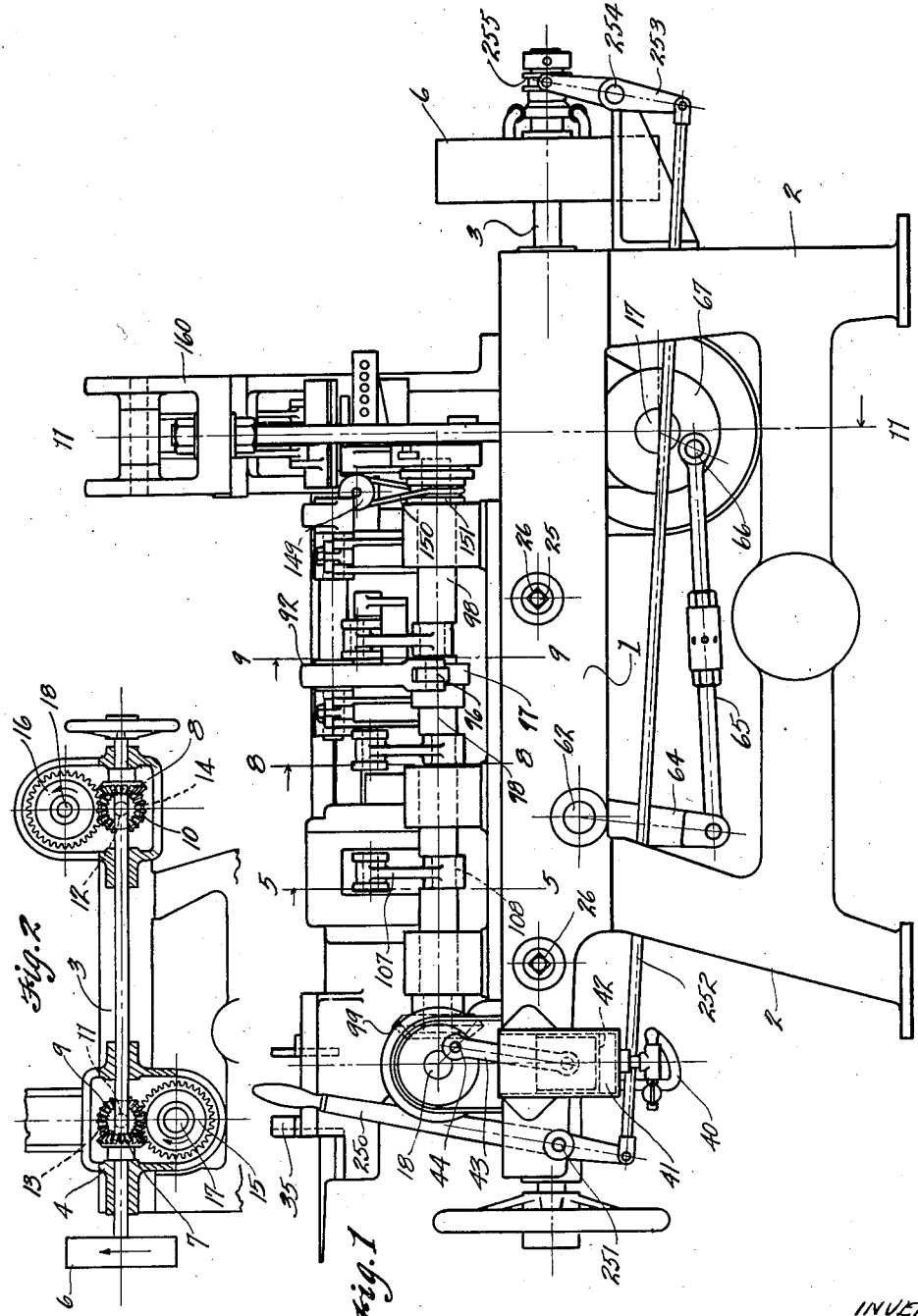
INVENTOR
NELSON TROYER
BY Richard J. Cook
ATTORNEY

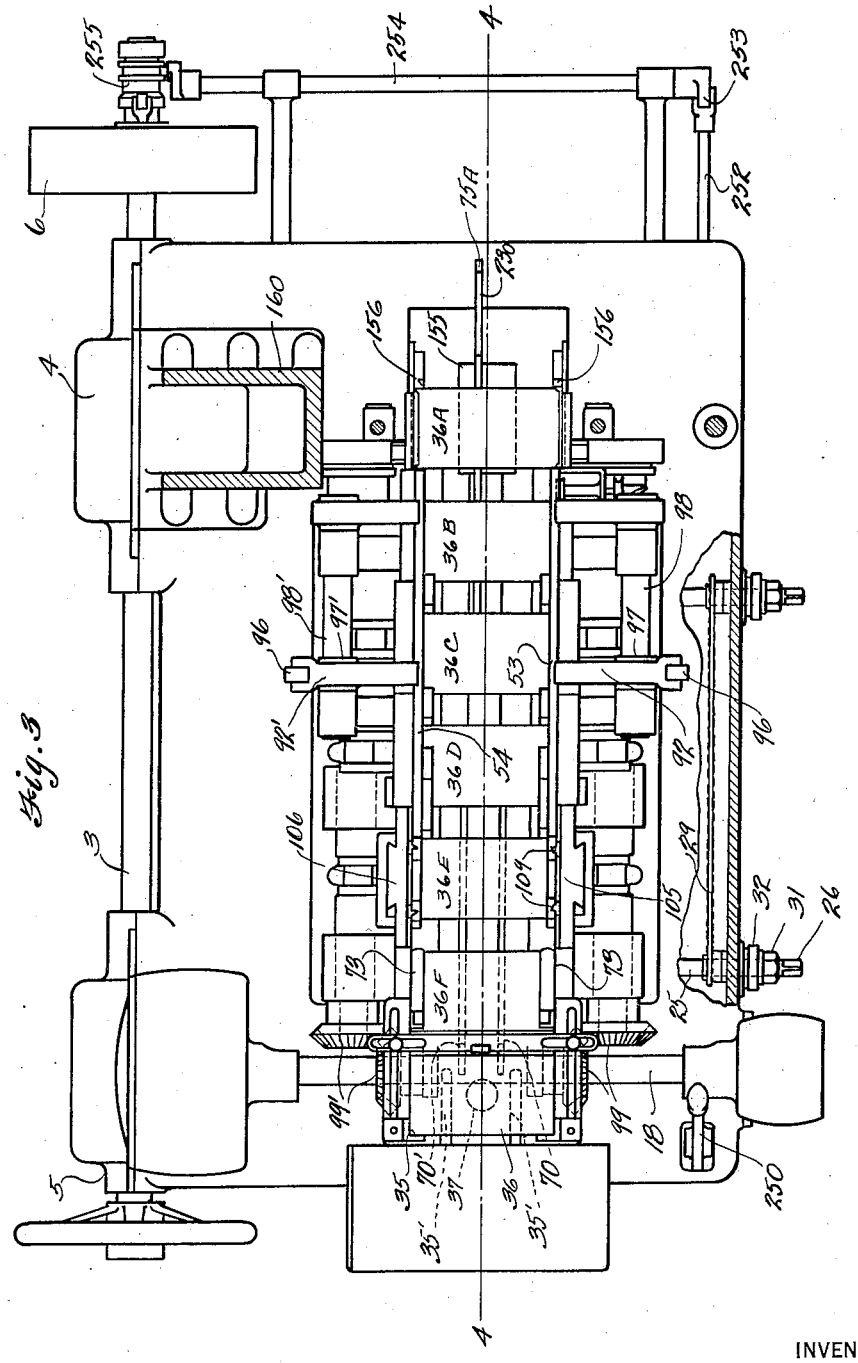

June 23, 1925.
N. TROYER
1,543,460
CAN BODY FORMING MACHINE
Filed Jan. 26, 1922
9 Sheets-Sheet 3
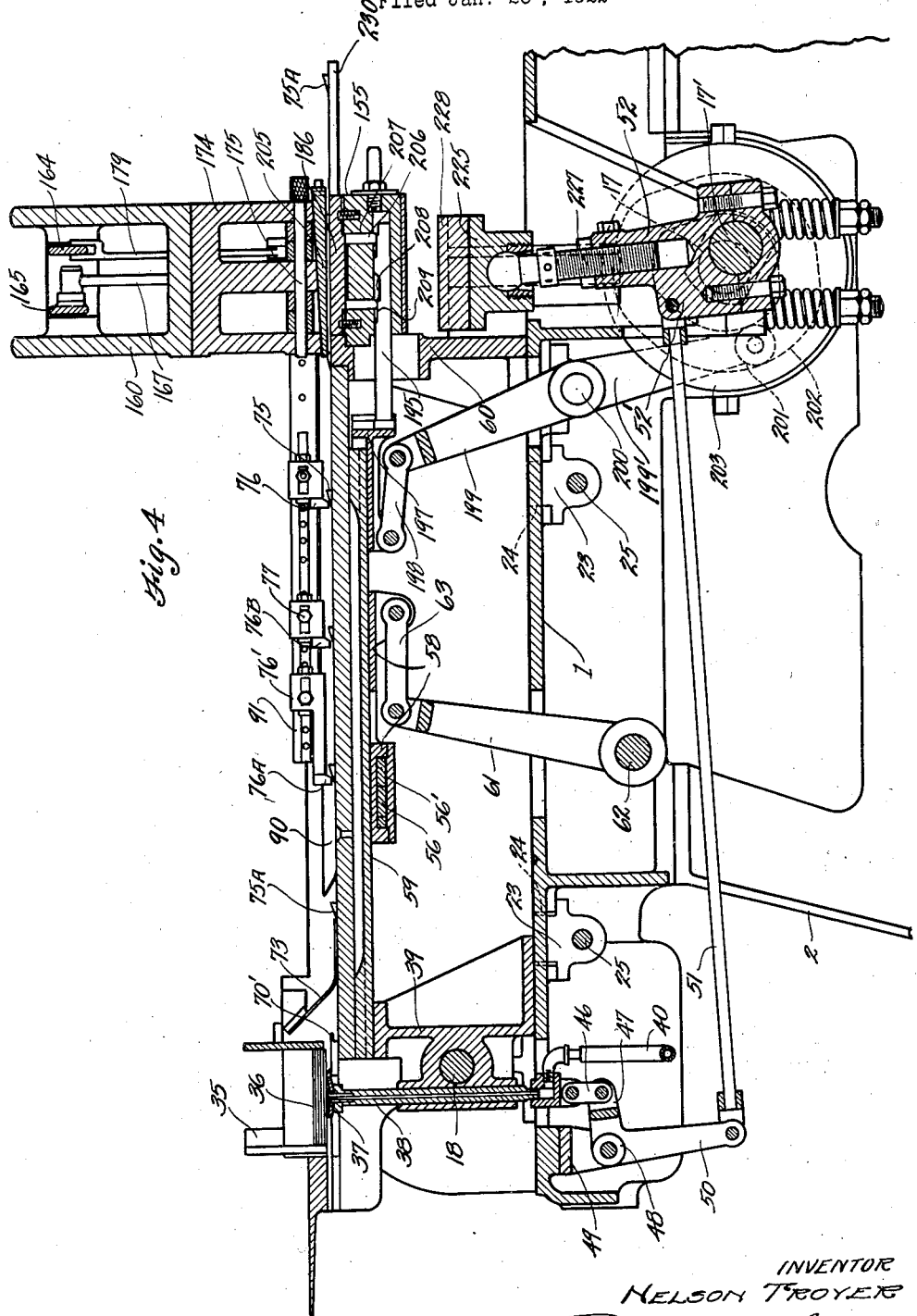
INVENTOR
NELSON TROYER
Richard J. Cook
ATTORNEY June 23, 1925. 1,543,460
N. TROYER
CAN BODY FORMING MACHINE
Filed Jan. 26, 1922 9 Sheets-Sheet 4
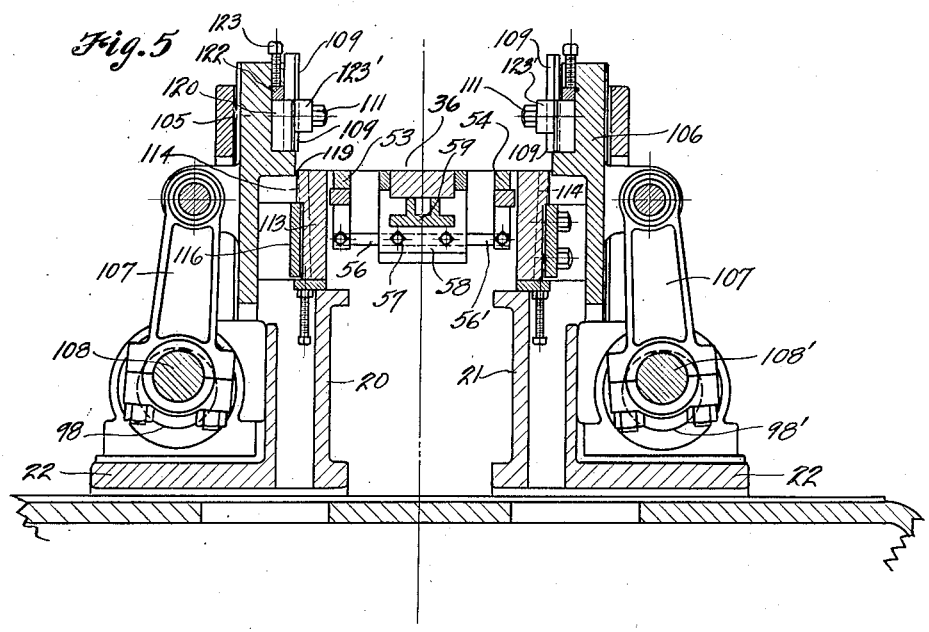
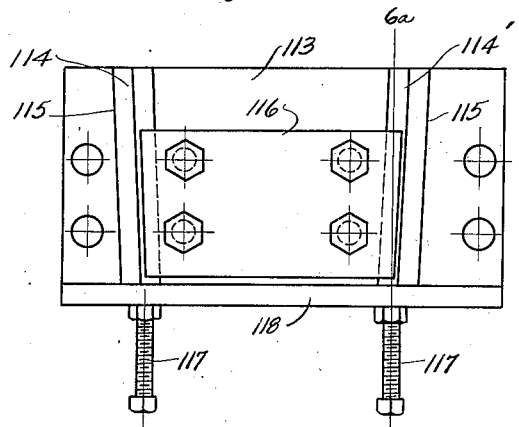
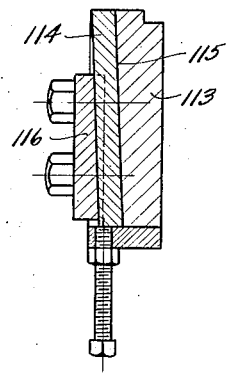
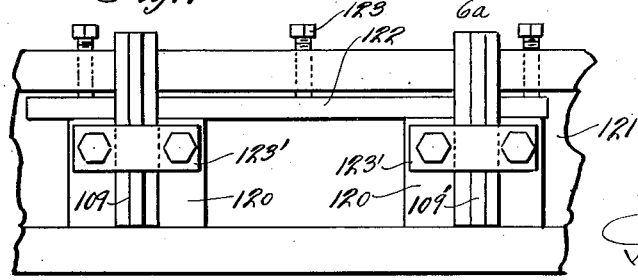
INVENTOR
NELSON TROYER
Richard J. Cook
ATTORNEY

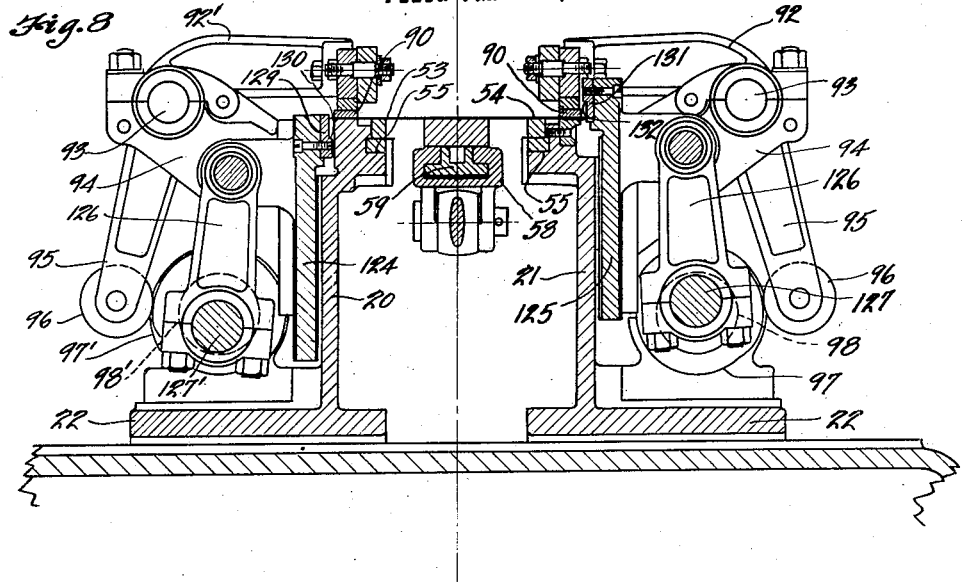

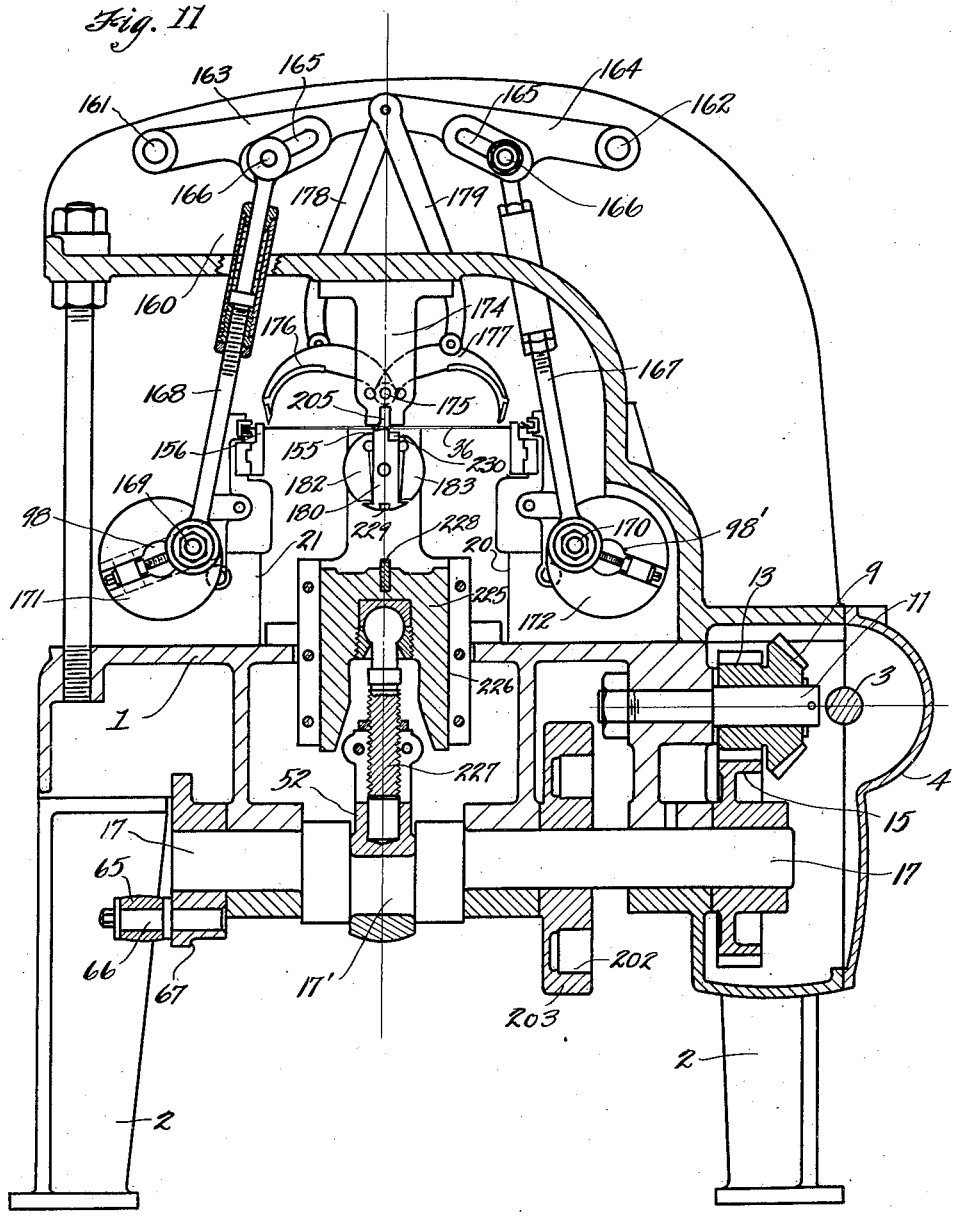

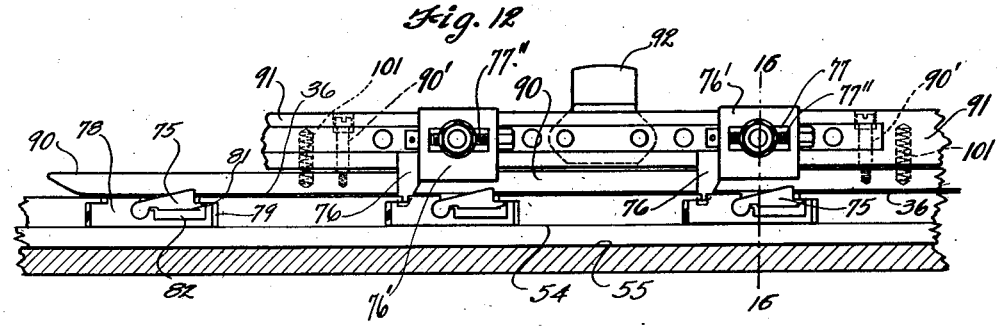
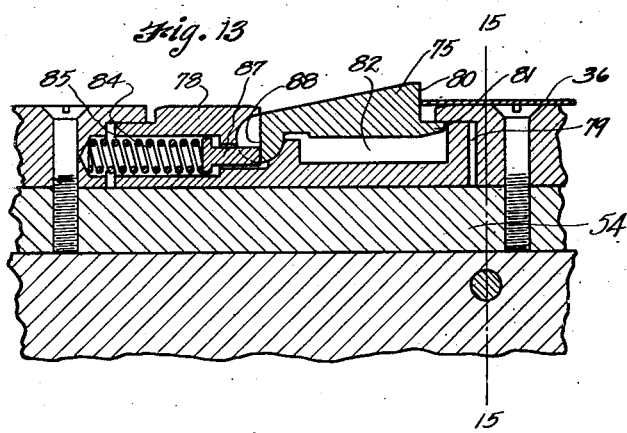
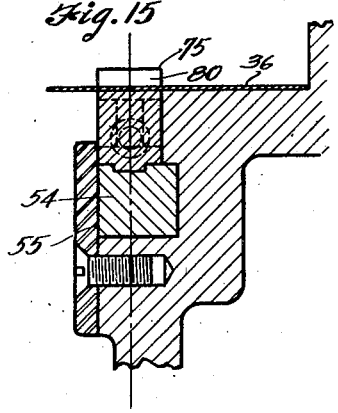
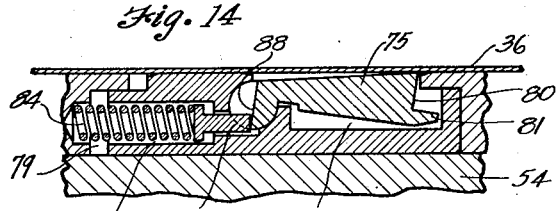
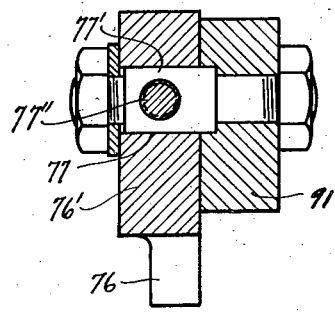

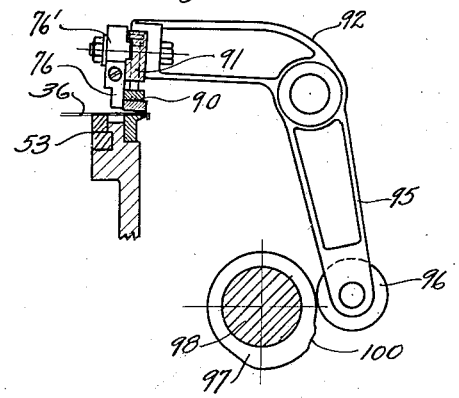
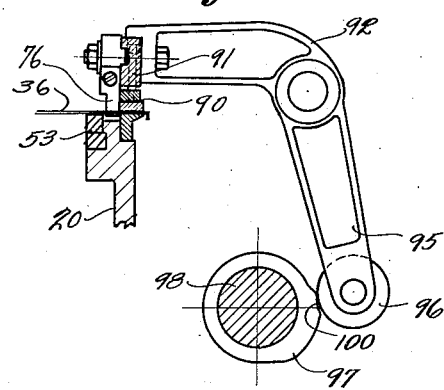
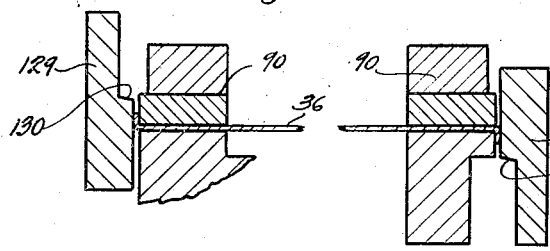
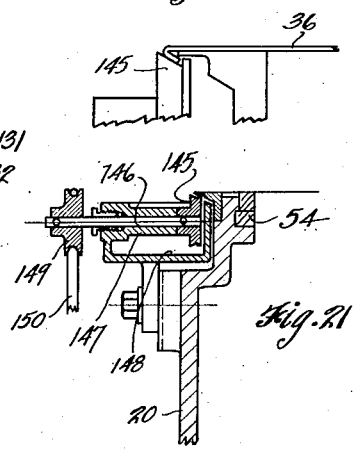
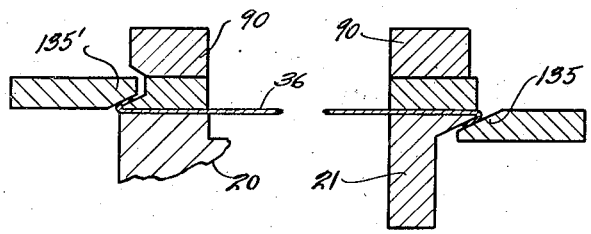

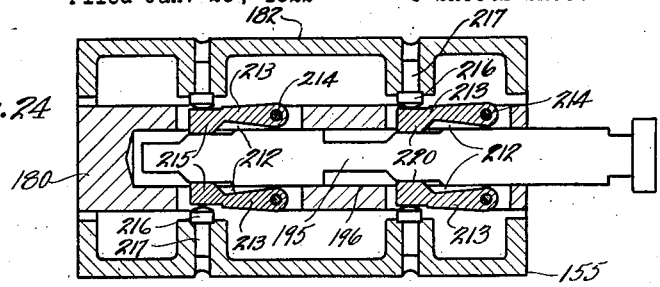
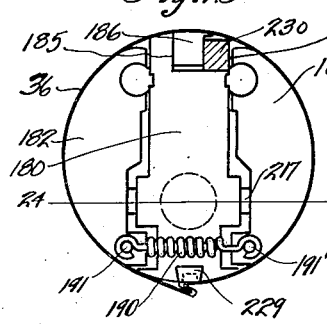
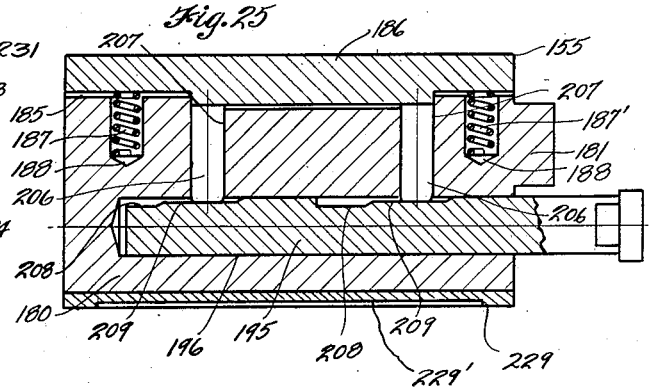
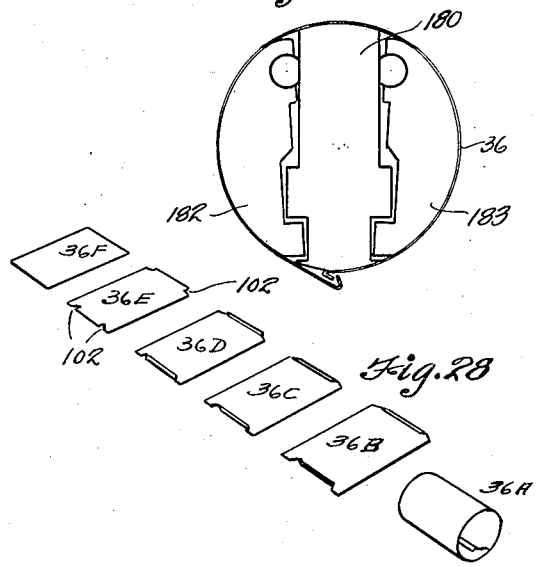
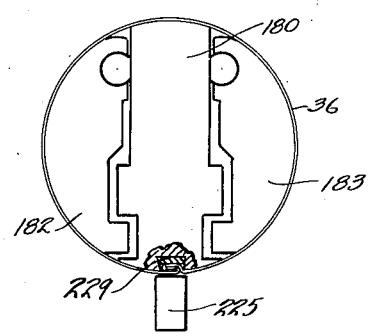

Patented June 23, 1925.

1,543,460

UNITED STATES PATENT OFFICE.

NELSON TROYER, OF SEATTLE, WASHINGTON, ASSIGNOR OF ONE-HALF TO SEATTLE ASTORIA IRON WORKS, OF SEATTLE, WASHINGTON.

CAN-BODY-FORMING MACHINE.

Application filed January 26, 1922. Serial No. 531,885.

*To all whom it may concern:*

Be it known that I, NELSON TROYER, a citizen of the United States, and a resident of the city of Seattle, county of King, and State of Washington, have invented certain new and useful Improvements in Can-Body-Forming Machines, of which the following is a specification.

This invention relates to improvements in can making machines; more particularly, to machines of that character designed for the purpose of forming cylindrical can bodies from blanks of sheet metal, which are advanced successively through the machine and, while being intermittently advanced, are acted upon by certain mechanisms which first notch the edges of the blanks, then, by a two-stage operation, turn back the edges of the blanks to form hooks, then apply a flux to one of the edges and finally join the hooks and clamp the same together in a closed seam.

The principal object of the present invention is to provide a smooth running, efficient and durable machine of the above character wherein the different mechanisms for accomplishing the above operations have been so arranged and designed that high speed of operation is possible, and the output from such machine greatly increased over the output of machines previously used for doing the same work.

Another object of the invention resides in the provision of reciprocating feed bars for advancing the body forming blanks through the machine, and in the provision on said bars of flexible feed fingers which engage the blanks and cause them to be located accurately with respect to the parts which operate thereon.

Another object of the invention resides in the provision of positive stop members, against which the yieldable fingers advance the blanks, and in the construction and means for operating certain clamping bars which retain the blanks in position while being operated upon by the notching and hook forming mechanisms.

Another object of the invention is to make possible an increase in the speed of operation through the provision of a two-stage hook forming mechanism, where previously this had been done in a single operation.

A still further object of the invention resides in the construction of the horn about which the bodies are formed, the means for expanding and contracting the horn, and independently adjustable cranks which operate the wings whereby the bodies are formed about the horn.

In accomplishing these and other objects of the invention I have provided the improved details of construction, the preferred forms of which are illustrated in the accompanying drawings, wherein—

Figure 1 is a side elevation of a can body forming machine embodying features of construction according to the present invention.

Figure 2 illustrates, in side elevation, parts of the driving gearing of the machine which are located on the side of the machine opposite that side shown in Figure 1.

Figure 3 is a plan view of the machine; parts being in section for better illustration.

Figure 4 is a central, longitudinal section of the same, taken substantially on the line 4—4 in Figure 3.

Figure 5 is an enlarged, transverse, vertical section, taken substantially on the line 5—5 in Figure 1, particularly illustrating the location of the punches for notching the opposite edges of the can forming blanks with respect to the guideways along which the blanks are advanced, and the means for actuating the punches.

Figure 6 is an enlarged face view of one of the die holders and its supporting means.

Figure 6ª is a sectional view taken on the line 6ª—6ª in Figure 6.

Figure 7 is a face view of one set of punches and the adjusting and mounting means.

Figure 8 is an enlarged, transverse section, taken through the folder housings on the line 8—8 in Figure 1, illustrating the disposition of the body clamping means, and showing the can body in position for the first hook forming operation.

Figure 9 is a similar view, taken on the line 9—9 in Figure 1, showing the body in the second hook forming operation.

Figure 10 is a detail view illustrating the connection of an adjusting shaft for the folder housings with the side of the base frame.

Figure 11 is an enlarged section, taken on the line 11—11 in Figure 1, illustrating the construction and mode of operation of the wing clamps, whereby the can bodies are formed about the horn, and the means for actuating the seam locking bumper.

Figure 12 is a detail view of a part of a feed bar with the flexible feed fingers whereby can blanks are forwarded through the machine, and the blank clamping bars.

Figure 13 is a detail, sectional view of one of the feed fingers and its mounting block, showing the same in the position it assumes when a can body has been advanced against a stop.

Figure 14 is a similar view, showing the position the finger assumes on an outward movement of the feed bar, which permits the finger to pass under the advanced blank.

Figure 15 is a sectional view taken on the line 15—15 in Figure 13.

Figure 16 is a detail section, taken on the line 16—16 in Figure 12.

Figures 17 and 18 are detail views, illustrating successive movements of the clamping bars.

Figure 19 is a fragmental, sectional view of parts of the first stage hook forming mechanism.

Figure 20 is a similar view of the second stage hook forming mechanism.

Figure 21 is a sectional view of the fluxing roll.

Figure 22 is an enlarged view of parts of the same, illustrating contact of the fluxing roll with a hook of the can body blank.

Figure 23 is an end view of the horn about which the bodies are formed, showing it in expanded position and a can blank about it.

Figure 24 is a horizontal, sectional view of the horn, taken on the line 24—24 in Figure 23.

Figure 25 is a vertical section of the same.

Figures 26 and 27 are end views of the horn, respectively in collapsed and expanded position.

Figure 28 is a perspective view showing body forming blanks during different stages as they are advanced through the machines.

Referring more in detail to the several views of the drawings—

1 designates, as a whole, the base frame of the machine whereon operating mechanism is mounted. This frame comprises a horizontal bed plate, supported at a suitable height by legs 2 located at its corners. Extending horizontally along one side of the frame, is a power shaft 3. This is supported by, and extends revolubly through, gear casings 4 and 5, which are secured in spaced relation to the frame. At one end of the shaft 3 is a belt wheel 6 through which power may be transmitted to the machine, and keyed onto the shaft within the housings 4 and 5, as shown best in Figure 2, are bevel gears 7 and 8 which respectively operate in mesh with similar gear wheels 9 and 10 rotatable on stub shafts 11 and 12 mounted in the side beam of the base frame on the same horizontal level of the shafts 3 and perpendicular thereto. Cast integral with the bevel gear wheels 9 and 10, are spur gears 13 and 14 which operate in mesh with larger gears 15 and 16 that are keyed onto the ends of the shafts 17 and 18 that extend transversely of the frame at levels respectively below and above the level of the shaft 3. The shaft 17, as shown in Figure 11, is rotatable in bearings formed as a part of the frame, and has driving connections, shown best in Figure 4 and presently described, whereby it operates the bumper that locks the can seam, the feed bars and also the suction feed mechanism which delivers the can blanks to the machine. The shaft 18, as shown best in Figures 2 and 3, serves as an actuating means for the notching dies and clamping bars which retain the bodies while being operated upon.

*Folder housings and adjustment mechanism.*

Supported upon the bed plate, longitudinally thereof, are two parallel, laterally adjustable beams 20 and 21 which together constitute the folder housings, and in this capacity serve as guideways along which the can blanks are advanced during the body forming process. In order that this guideway may be made to accommodate blanks of different lengths, I have provided for adjusting the housing beams laterally toward and from each other, and the means whereby this is accomplished includes mechanism as follows: Each of the beams is provided with a horizontal base flange 22 and on the under sides of these flanges adjacent the opposite ends of the beams, are depending nuts 23 which are rigidly fixed to the beams and are extended downwardly through guide slots 24 formed transversely in the bed plate. Extending transversely of the frame through corresponding nuts of the two beams, are adjusting shafts 25, see Figure 9, each of which has portions provided with right and left hand threads along which the nuts of the opposite beams move upon rotation of the shafts, so that both of the beams will be adjusted inwardly, or outwardly, an equal distance. These adjusting shafts extend through one side of the frame 1 and are provided at their outer ends with heads 26, see Figure 3, for receiving a wrench whereby they may be rotated to effect the beam adjustment.

In order that the beams, during adjustment, may be moved equal distances and retained parallel, I have fitted each shaft 25 adjacent its outer end with a sleeve 27 and these sleeves have alined sprocket wheels 28 thereon about which a chain belt 29 operates. Each sleeve, at its inner end, is seated against a collar 30 on its shaft and is held clamped against the collar by a nut 31 which is threaded onto the shaft against the outer end of the sleeve. The sleeves 27 rotate within sleeves 32 which are threaded through the side flange of the frame 1 and which, by inward or outward adjustment, will effect longitudinal adjustment of the shafts 25; this being desirable in order to properly set and aline the beams.

The above described construction provides for a quick and accurate adjustment of both beams, and such adjustment adapts the guideways to can body blanks of various lengths and provides for making cans of different size.

Blank feeding and advancing means.

At one end of the machine, see Figures 3 and 4, is a frame 35 wherein a stack of can body forming blanks 36 may be contained. These blanks are supported on two fixed fingers 35', see Figure 3, in such manner that they will be delivered singly from the under side of the stack for advancement through the machine. The means whereby this is accomplished comprises a sucker head 37 that is fixed to the upper end of a tube 38 that is reciprocally mounted within a guide block formed as a part of a bracket 39 erected centrally upon that end of the bed plate. At its lower end, the tube 38 has a flexible tube connection 40 with a pump cylinder 41 fixed to the frame 1, Figure 1, whereby a piston 42 operates to produce the desired suction in the sucker head 37; the said piston being operatively connected, by means of a pitman 43, with an eccentric pin 44 at the end of the shaft 18. The lower end of the tube 38 also is connected by means of a link 46, with a horizontal arm 47 of a bell crank lever 48, that is pivotally mounted by means of a bracket 49 to the under side of the bed plate, and which has a depending arm 50 connected, by means of a rod 51, to a lug 52' on a pitman 52 mounted on an eccentric crank 17' of the shaft 17.

Operating in synchronism with the reciprocal movement of the sucker tube, are two reciprocally mounted, horizontal feed bars 53 and 54 which are slidable in guideways 55 provided therefor along the upper edges of the beams 20 and 21. These two bars are so connected that they will be reciprocated together, the connection comprising two transversely directed bars 56—56', see Figures 4 and 5, which are fixed thereto and at their inner ends are adjustably fixed by set screws 57, within a block 58 that is slidable along a guide beam 59 that extends parallel with the feed bars and centrally between them, and which is supported at its ends from the bracket 39 and a similar bracket 60 at the other end of the frame.

The feed bars 53 and 54 are reciprocated by means of a rocker arm 61 mounted on a rocker shaft 62 being connected at its outer end to the block 58 through the intermediacy of a link 63, and the shaft 62 is actuated by a rocker arm 64 which extends downwardly therefrom and at its lower end is connected to one end of a rod 65, see Figure 1, which at its other end is fixed to an eccentric pin 66 in a wheel 67, Figure 11, on the inner end of the shaft 17.

The connections described provide that upon rotation of the shaft 17, the shaft 62 will be oscillated by means of the connecting rod 65 and this, through the arm 61 and link 63, will cause reciprocal movement of the slide block 58 and a like movement of the feed bars 53 and 54. Also, there is caused a vertical, reciprocal movement of the sucker tube by the connection provided through the rod 51 and bell crank 48.

At the ends of the feed bars 53 and 54, are hooked feed fingers 70 and 70' which, upon reciprocal movement of the bars, are moved outwardly beneath the stack of blanks 36 and, upon each inward movement, engage with the lower one of said blanks, and cause it to be drawn inwardly into the guideway of the folder housing; the engaged blank being then drawn down into position so that it will be engaged, by action of the sucker head 37.

The movement of the feed fingers 70 and the sucker head are so synchronized that the latter, which engages the lower blank of the stack, moves downwardly at the same time the fingers start inwardly and, due to the suction produced in the pump cylinder, the sucker head bends the lower blank downwardly at its center, so that it will be engaged by the feed fingers and no other blank will be drawn along with it.

As each blank is moved from the bottom of the stack onto the guideways, its edges are advanced beneath paired spring arms 73, as shown in Figure 4, which retain it against possible outward movement on a subsequent outward movement of the feed bars and in position to be further advanced on the following inward movement of the bars.

Blank notching and hook forming mechanism.

As the bars 53 and 54 are reciprocated, the blanks 36 which are drawn successively from the stack, are advanced intermittently certain predetermined distances along the folder housings. The first inward reciprocal movement of the feed bars advances a blank from the stack to the position where it is held by the arms 73; that being the position occupied by the blank 36$^F$, see Figure 3. A second reciprocal movement advances this blank to the position occupied by the blank 36$^E$ which is in the position for notching its edges. Successive reciprocal movements advance the blank to the positions designated by 36$^D$, 36$^C$, 36$^B$ and 36$^A$. This advancing is accomplished by means of a series of spring fingers 75 mounted in paired relation at spaced intervals within the top edges of the two feed bars and which are adapted, as the bars move outwardly, to be depressed by and to pass beneath the advancing blanks to the outer sides thereof and to then spring upwardly so that, on inward movement of the bars they will engage the blanks and advance them farther along the guideway. In each instance the advance movement of the blanks is limited by means of paired stops 76, presently described, against which the forward edges of the blanks are moved.

The construction of the feed fingers and the manner in which they are mounted within the feed bars forms a principal part of the present invention since the construction permits them to be yieldably depressed to pass beneath advancing blanks and also to yield in a direction longitudinally of the feed bars so as to compensate for any forward movement of the feed bars after the blanks have engaged the stop members. In construction each of the flexible feed fingers is identical and for this reason only one will be described in detail, with the understanding that the description relates equally to all.

Referring to Figures 12, 13 and 14, it will be noted that the finger 75 is pivotally fixed at one end within a block 78 which in turn is mounted with a limited slidable movement within a pocket 79 in the feed bar. At its forward end, the finger has a shoulder 80 adapted to engage the blanks 36, so that on inward movement of the feed bars the blanks will be advanced thereby. Below the shoulder is an extended lip 81 adapted to engage a stop formed in the pocket to limit the upward movement of the finger. This end of the finger is adapted to swing downwardly into a pocket 82 in the block 78 to permit it to pass beneath the blanks as the bar moves outwardly, but the finger is normally retained in an extended position by means of a coiled spring 84 located within a bore 85 in the block 78 and bearing at one end against the end wall of the pocket 79, and at its other end against a pin 87 which engages a shouldered portion 88 on the pivot end of the finger below the pivotal center in such manner that this spring not only holds the finger yieldingly extended but also yieldingly retains the block 78 in an advanced position in the bar pocket.

Assuming that a blank has been advanced by the first reciprocal movement of the feed bars to the position occupied by blank 36$^F$, it will be seen that on a following reciprocal movement, the first set of feed fingers, designated at 75$^A$ in Figure 4, will pass outwardly beneath the blank and, when the bars move inwardly, will engage and advance the blank to the positions occupied by blank 36$^E$ with the forward edge of the blank abutted against the first set of stops 76$^A$; the stops being engaged before the final movement of the bars and the farther movement of the bars compensated for by the relative, yieldable movement of the finger mounting blocks 78 in the pockets of the feed bars. The blank is held in this position by means of clamp bars 90 which are disposed along the upper edges of the beams 20 and 21 and which take effect before the feed bars have started back, thereby retaining the blank positively at the set position.

The clamping bars 90, at the opposite sides of the guideway, are yieldably supported by bolts 90′, see Figure 12, along the under edges of bars 91 that are carried at the inner ends of bell crank levers 92 and 92′ shown in Figures 1, 3, 8, 17 and 18, which are pivotally mounted on pivot pins 93 in brackets 94 which are fixed to the outer sides of beams 20 and 21. These bell cranks have depending arms 95 equipped at their lower ends with rollers 96 which engage cam wheels 97 and 97′ on shafts 98—98′ supported at opposite sides of the folder housings and driven by gearing connections designated at 99 and 99′ from the shaft 18. The cams 97—97′ are so designed and their shafts so synchronized with the movement of the feed bars that they will effect no movement of the clamping bars until near the end of an advancing movement of the feed bars. Just before a blank engages the stops 76, the latter which are carried by the bars 91 are given a slight downward movement which brings their ends into position to stop the blank but effects no holding pressure against it by the clamping bars; this movement being caused by a slight rise on the cams, as shown at 100 in Figures 17 and 18, and takes place just after the feed bars have been fully advanced and are ready to start on an outward stroke. A farther advance of the cams clamps the bars against the blank and retains it. There is always a slight holding tension placed on the blanks by the clamping bars 90 by means of springs 101 that are disposed between the bars 90 and 91, see Figure 12, and which are retained in place within sockets provided in these bars.

Notching operation.

With the blank in the position designated at 36$^E$, its opposite edges are notched as shown at 102 in Figure 28; the means for notching being best shown in Figures 5, 6, 7 and in plan view in Fig. 3. Referring to Figure 5, 105 and 106 designate punch slides, that are mounted for vertical reciprocation; this being accomplished by means of connecting rods 107 pivotally fixed thereto and on eccentric journals 108—108' in the shafts 98—98'. Mounted adjustably on the plates 105 and 106 are punches 109 held in position by clamping plates which overlie them and which are secured by bolts 111, as presently described. The lower ends of the punches 109 are adapted to be brought, by the reciprocal movement of the slides, into shearing relation with dies, 114, mounted in die holders 113 supported from the folder housings. Figure 5 shows the blank and dies in the positions they assume before notching, and Figure 28 shows the character of the notches formed at opposite ends of the blank.

Since the dies used in this construction often need to be sharpened and reset, I have provided certain adjustments to compensate for such sharpening. In Figures 6 and 6ᵃ, I have illustrated the lower dies and their mountings, wherein 114—114' designate the dies proper. These comprise bars that are slidably contained within outwardly sloping grooves 115 in the holder 113, and are held therein by means of the plate 116 which at its ends overlies the dies and is bolted to the holder. Set screws 117 are threaded upwardly through a plate 118 that is fixed to the lower edge of the holder and which engage the lower ends of the dies to retain them at adjusted positions. The dies are provided with longitudinally extending V-shaped grooves 119 which correspond to the cutting edges of the punches 109.

In Figure 7 I have illustrated the mounting of a set of punches 109—109'. The punches are herein shown to be held within blocks 120 located adjustably in an inwardly opening slot 121 in the folder housing. A plate 122 overlies these blocks and may be tightened against the latter to hold them at adjusted positions by means of a plurality of set screws 123 threaded through the upper portion of folder housings, as shown in Fig. 5. The dies are held in the blocks by means of plates 123' which overlie them and are bolted to the blocks.

Hook forming mechanism.

Upon the completion of the notching operation, the blank is advanced by the following inward movement of the feed bars to the position occupied by the blank 36ᴰ, Figure 3, where it is abutted against the second set of stops 76ᴮ and again clamped during the first part of a two-stage hook forming operation; these two operations are best illustrated in Figures 8, 9 and Figures 19–20. Figure 8 shows the blank 36 in clamped position.

In the first operation of the hook forming process, the edges of the blank between the two notches, at its ends, are bent, one upwardly and the other downwardly. This is accomplished as follows: Supported at the outer sides of the beams 20 and 21, Figure 8, are slides 124 and 125 which are reciprocated vertically by means of connecting rods 126 fixed thereto and on eccentric journals 127—127' on the shafts 98—98'. On the slide 124 is a plate 129 provided with an upwardly facing shoulder 130 which, upon upward movement of the slide, will engage the edge of the blank, which extends slightly beyond the outer edge of the clamp bar, and will cause the edge to be bent upwardly as shown at the left in Figure 19. Likewise, on the slide 125, is a plate 131 with a downwardly facing shoulder 132 which will be brought into engagement with the other edge of the blank upon downward movement of the die and will bend this edge downwardly, as shown at the right in Figure 19. The blank is then released and forwarded by a subsequent movement of the advancing bars to the position 36ᶜ where it is clamped for the second stage operation.

In the second operation, the laterally turned edges are bent farther over so as to form hooks which later are brought together to join the edges of the blank to form the cylindrical body. Figure 9 shows the blank in position and Figure 20 shows the hooks completed. After the blank is clamped in position, its laterally turned edges are engaged by the beveled end portions 135—135' of levers 136—136' that are pivotally mounted on shafts or pins 137—137' at opposite sides of the folder housings. These levers have rocker arms 138—138' extended therefrom which are connected by means of rods 139 with eccentric journals 140—140' on shafts 98—98' in such manner that the shoes are swung inwardly and their edges engaged with the edges of the blank to bend them inwardly. On completion of this operation, the blank is further advanced to the position 36ᴮ where no operation thereon takes place, and then is advanced to its final position where it is formed about the horn.

In passing to this latter position it is desired to apply a flux to one edge of the blank so as to facilitate soldering of the seam; the means for soldering not being illustrated in connection with the present machine. The means for applying the flux, is shown in Figures 21 and 22, and consists of a wheel 145 mounted on a shaft 146 that is supported in a bearing 147 formed as a part of a flux container 148 that is secured to the beam 20. At the outer end of the shaft 146 is a belt wheel 149. A belt 150 operates over this wheel and a belt wheel 151 on shaft 98, Figure 1, so that the wheel 145 is revolved in the fluxing solution and brushes against the hooked edge of the blank as the latter advances, to apply the flux thereto.

The horn about which the body is formed is designated as a whole at 155 in Figures 4 and 11, and the horn is shown in detail in Figures 23 to 27 inclusive. It is supported centrally of the guideway along which the blanks are advanced and in such position that the blanks will be advanced into proper relation thereto for forming. It is fixed at its inner end to the bracket 60 and is held perfectly rigid thereby. As the blanks are advanced to the horn, they are limited in their advance by being abutted against stops 156, Figures 3 and 11, at the forward ends of the guideways.

Supported at that end of the frame is an overhanging arm 160 and pivotally fixed thereto by means of pivot pins 161 and 162, at their outer ends, are two lever arms 163 and 164 which extend in such position that their free ends are practically in the vertical line of the horn. Intermediate their ends, each lever has a longitudinally directed slot 165 therein along which bolts 166 are adjustable. These bolts have connected thereto the upper ends of connecting rods 167 and 168 which at their lower ends, are fixed to eccentric pins 169—170 in heads 171 and 172 fixed respectively on the ends of shafts 98 and 98'.

Fixed to the under side of the arm 160, directly over the horn, is a bracket 174, and pivotally fixed thereby by means of a pivot pin 175 extended through their inner ends, are paired wing clamps 176—177 adapted to swing from and against opposite sides of the horn and which are respectively connected by means of links 178—179, attached pivotally to their back sides, with the swinging ends of the levers 163 and 164. This construction provides that, rotation of the shafts 98—98' effects a certain swinging movement of the wing clamps which brings them into engagement with the blanks after they are advanced onto the horn and bends their opposite ends downwardly and about the horn, as shown in Figure 26, with the hooked edges of the blank overlapped so that, by an expanding of the horn, they will be hooked together.

The horn itself comprises a central body 180 which, at its inner end, has an extension 181 whereby it is fixed within the bracket 60, and at opposite side of this body has hingedly supported wings 182 and 183 which extend the length of the horn and are adapted to swing outwardly at their lower edges so that the can body will be expanded. Seated within a groove 185 that extends longitudinally along the upper edge of the body 180, is a bar 186 which is yieldingly supported by means of coiled springs 187—187' located in bores 188 in the body and which engage the under side of the bar near its ends. This bar serves as a clamp bar which may be wedged tightly against the under side of the blank.

Normally the horn wings are held in a contracted position, as shown in Figure 26, by means of a short coiled spring 190 which has its ends secured to pins 191—191' fixed in the inner ends of the wings, but after a can blank has been clamped about the horn, these wings are expanded to hook the edges of the can together.

The means for expanding the horn wings, and for tightening the clamp bar comprises means illustrated best in Figures 4, 24 and 25, wherein 195 designates a rod which is slidable within a bore 196 entering the inner end of the horn and extending longitudinally thereof. At its outer end this rod is connected with a block 197 that is slidable on the beam 59 and which is connected, by means of a link 198, with the upper end of a rocker lever 199 pivotally supported at one end on a pivot shaft 200 and another lever 199' mounted on the shaft 200, and having a wheel 201 at its lower end that is adapted to follow within a cam slot 202 in a wheel 203 that is fixed on the shaft 17. The cam slot is so constructed and the wheel is so synchronized with the movement of the two feed bars, that while a blank is being advanced onto the horn, the rod 195 will be withdrawn to its outer limit, but after the blank has been positioned above the horn, the rod 195 is given a slight inward movement which effects the clamping of the blank between the bar 186 and a similar anvil bar 205 that is fixed within a groove in the lower end of the bracket 174 which carries the wing clamps. This clamping movement of the bar 186 is accomplished by means of two posts 206 which are contained in vertical bores 207 in the body 180 and at their upper ends engage the under side of the bar, and at their lower ends, rest upon the rod 195. There are cam surfaces 208 on this bar whereon the posts rest when the bar is in its outer position, and higher surfaces 209 onto which they will ride when the rod is moved inwardly and will thereby cause the bar 186 to be lifted to clamping position.

The expanding movement of the wings of the horn is effected in like manner after the blank has been clamped by the bar 186; this being accomplished by means shown best in Figure 24. Mounted at opposite sides of the rod 195 and at each end of the horn, in slots 212 provided in the walls of the body 180, are paired levers 213, having ends pivotally mounted on pins 214 and having heads 215 at their opposite ends engageable on the inner sides with the side face of the bar and on their outer sides with the heads 216 of studs 217 fixed in the inner face of the wings. After a blank has been clamped in position, and the wing clamps have formed it about the horn with its ends in overlapped relation, as shown in Figure 26, the wings of the horn are expanded so that the hooked ends are hooked together, as shown in Figure 23. This is done by a second inward movement of the rod 195 under the influence of the cam 203 which causes the heads 215 to ride upon shouldered portions 220 of the rod 195 and to thereby cause the wings to be urged apart. With the edges of the blanks hooked together in this manner, the seam is bumped and mashed tightly together by the action of a bumper 225 that is slidable vertically in guideways 226 and is connected, by a rod 227 with the bearing 52 on the eccentric crank 17' of the shaft 17. In the top of the bumper is a hardened bar 228 which engages the can seam and mashes it tightly against a hardened spline 229 that is dovetailed into the underside of the horn as shown in Figures 23 and 25 and which has a groove 229' in its under side to receive the seam of the can therein.

After this has been done, the can body is discharged upon the next outward movement of the feed bars by a finger 75 at the end of a bar 230 that is fixed to reciprocate with the block 58 and which extends through a longitudinal groove 231 in the top of the horn.

In order that this machine may be adapted to the making of can bodies of various diameters, I have provided several features of adjustment besides that previously described for the adjustment of the folder housing beams, the dies and punches. The principal parts requiring adjustment, when a change in the size of a can body is made, are disclosed in Figure 11. Assuming that a can body of larger diameter is desired, it is first necessary to adjust the housing beams 20 and 21 so that the blank will fit properly within and can be advanced along the guideways; a horn of a desired diameter will then need be substituted for the smaller one and this change necessitates a change of wing clamps that are adapted to that particular horn, and also requires an adjustment of the means which operate these wing clamps.

Adjustment of the bumper 225 is also required, since with a larger horn it can not be moved as far upwardly as previously for the bumping of the seam. To compensate for the lessened movement required for the larger wing clamps, I have provided that the connecting rods 167 and 168 be adjustably fixed at their upper ends to the levers 163—164 by means of bolts 166 that are movable along the slots 165 in the levers so that the arc through which these levers swing may be varied and at their lower ends they are connected by bolts 169—170 with the heads 171 and 172 at the ends of the shafts 98—98'. These bolts are mounted in blocks that are adjustable toward or from the centers of the head so as to vary the throw. Adjustment of the bumper is effected by threading the connecting bar 227 into, or from the core rod 52 so that it will co-operate properly with the horn.

I have also provided for adjusting the stops 76 so that the can blanks when advanced will be accurately positioned with relation to the various parts that operate thereon. Referring to Figures 12 and 16, it will be noted that the stop members are carried by or formed as parts of the blocks 76' that are supported slidably by means of bolts 77; these bolts being mounted within the stop bars 91. The blocks 76' are provided with slots 77 which fit about squared sections 77' of the bolts and set screws 77'' are threaded through the squared portion of the bolts and pass through holes in the ends of the block 76' which, by rotating, will move the blocks to adjust the stops to the desired positions.

An operator using the machine controls it by means of a lever 250 mounted upon the frame by a pivot pin 251. The lower end of this lever is connected to a rod 252 which, in turn, is connected by a lever 253 to a cross shaft 254 which connects with certain clutch mechanism as designated at 255, whereby the belt wheel 6 is caused to rotate the shaft 3.

Having thus described my invention, what I claim as new therein and desire to secure by Letters Patent, is:

1. In a can body forming machine, the combination with a guideway along which can body forming blanks may be intermittently advanced and mechanism for operation on the blanks when in different positions along the guideway, of reciprocally movable means, fingers on said means for engaging the blanks to advance them successively and intermittently along the guideway and stop members operating synchronously with the advancing means from and into the path of said blanks to position them properly to be operated on.

2. In a can body forming machine, in combination, a guideway along which can body forming blanks may be intermittently advanced, means adjacent the guideway for operation on said blanks when at different positions along the guideway, reciprocally moving bars, fingers on said bars for engaging said blanks to advance them with intermittent movement along the guideway, stop members movable into and from the guideway to properly position the blanks to be operated on and clamps movable from and against the blanks to retain them while operated on.

3. In a can body forming machine, comprising a guideway, means adjacent the guideway for operating on the blanks advanced therethrough, reciprocally movable and yieldable members for advancing the blanks, stop members movable into and from the guideway to position the blanks for the different operations thereon, clamping bars operable to hold the blanks while being operated on and means for moving the clamping bars against the blanks after the latter have engaged the stops, but before the completion of the advancing movement of the advancing members.

4. In a can body forming machine, in combination, reciprocally movable bars, means on the bars engageable with body forming blanks on successive outward movements of the bars to cause the blanks to be advanced by intermittent movements through the machine, stop members movable from and into position for limiting the advancement of the blanks by successive reciprocal movements of the bars, clamping bars engageable with the blanks to retain the latter against displacement during retraction of the advancing means, means operable against the blanks while clamped to form hooks on their opposite end edges, a horn, means for clamping the blanks about the horn to join the hooked ends thereof, and a bumper operable against the hooked ends to close the seam of the formed body.

5. In a can body forming machine, in combination, means at one end of the machine for feeding can body forming blanks thereto, a horn at the opposite end of the machine, reciprocally moving bars extending between the feeding means and the horn, yieldable feed fingers mounted at intervals along the bars engageable with the blanks to advance the latter, by intermittent movements, through the machine and to the horn, stop members operable from and into the path of the blanks to limit their advance movement by successive reciprocal movements of the bars, clamping means movable against the blanks to retain them during retractive movements of the advancing means, means operable while the blanks are clamped to notch opposite end edges of the blanks, means operable during two successive periods while the blanks are clamped for forming hooks on the opposite ends thereof between the notches, means for clamping the blanks about the horn to join the hooked ends together and a bumper operable against the hooked ends to close the seam.

6. In a machine of the class described, the combination with members forming a guideway along which can body forming blanks may be advanced and mechanism adjacent the guideway for operation on the blanks of stop members movable into and from the path of the blanks whereby the latter will be positioned properly with respect to the said mechanism which operates thereon, of reciprocally movable advancing bars and fingers yieldably mounted in the bars in position to engage and advance the blanks when the bars are moving inwardly and yieldable to pass beneath the succeeding blanks when the bars are moving outwardly.

7. In a machine of the class described, the combination with members forming a guideway along which can body forming blanks may be advanced and mechanism adjacent the guidway for operation on the blanks, of stop members movable into and from the path of the blanks whereby the latter will be positioned properly with respect to the said mechanism which operates thereon, a pair of advancing bars movable reciprocally parallel with the guide way, advancing fingers mounted on the bars engageable with and adapted to advance the blanks against the stops on inward movement of the bars and yieldable mountings for the fingers whereby a farther advance movement of the bars is permitted after the blanks have engaged the stops.

8. In a machine of the class described, the combination with a pair of folder housings forming a guideway along which can body forming blanks may be advanced and mechanism adjacent the guideway for operation on the blanks of stop members movable into and from the guideway to be engaged by the blanks during their advancement to position them for the mechanism operating thereon, a pair of reciprocally moving advancing bars, finger supporting blocks mounted on the bars and having a limited movement in a longitudinal direction thereof, downwardly yieldable fingers mounted in the blocks engageable with the blanks on forward movement of the bars to advance the blanks against the stops, and yieldable means engaging the blocks which retains them normally at their forward limit on the bars but permits a farther advance movement of the bars after the blanks have engaged the stops.

9. In a machine of the class described, a pair of folder housings forming a guideway along which can body forming blanks may be advanced, mechanism for operating on the blanks during their passage along the guideway, stop members movable into and from the guideway against which the blanks are advanced and are positioned for the operating mechanism, a pair of reciprocally moving advancing bars, fingers supporting blocks slidably mounted within the bars with a limited movement longitudinally thereof, fingers pivotally mounted in the blocks and springs engaging with the fingers whereby the fingers are yieldably held in extended position so as to engage the blanks during forward movement of the bars but are permitted to yield downwardly to pass beneath succeeding blanks during retractive movement of the bars, and the bars are permitted to advance a limited distance after the blanks advanced by the fingers have engaged with their stops.

10. In a machine of the class described, the combination with a pair of folder housings forming a guideway along which can body forming blanks may be advanced of means mounted on the folder housings for operating on the blanks during the body forming process, stop members movable into and from the guideway to stop the blanks at proper positions with respect to the operating mechanism, clamping bars coacting with the guideway and movable from and against the blanks, a pair of reciprocally movable advancing bars, fingers yieldably mounted in said bars and engageable with the blanks to advance them against the stops, said fingers being yieldable in the longitudinal direction of the bars whereby the latter are permitted to advance after the blanks have engaged their stops and the blanks are retained in position until the clamping bars have taken effect against them.

11. A machine of the character described, comprising in combination, a frame structure provided at one end with means for forwarding a stack of can body forming blanks and at its opposite end with a horn about which the blanks are formed into can bodies, a pair of folder housings supported in parallel relation on the frame and forming a guideway along which the blanks may be successively advanced to the forming horn, mechanism supported by the folder housings for operating on the blanks as they are moved along the guideway, a pair of reciprocally moving bars having means at one end for delivering blanks singly from the delivery mechanism into the guideway and having fingers at intervals thereon engageable with the blanks on outward movement of the bars to advance them along the guideway, a pair of clamping bars coacting with the folder housings to secure the blanks while being operated on, stop members mounted on the clamping bars and means operating in synchronism with the advancing bars whereby the clamping bars are moved to first position the stops to be engaged by advancing blanks to locate the latter properly with respect to the mechanism operating thereon and then to actuate the clamping bars to position to hold the blanks during retractive movement of the advancing bars.

12. In a machine of the class described, the combination with frame members forming a guideway along which can body forming blanks may be advanced of a pair of reciprocally moving bars having fingers thereon whereby blanks delivered into the machine are advanced by successive forward movements of the bars along the guideway, mechanism adjacent the guideway for operating on the blanks to notch and form hooks on the edges thereof, a pair of clamping bars operable against the blanks to retain them while being operated on, stop members fixed to the clamping bars and stop adjusting means for varying the position of the stops on the bars, whereby the blanks may be located properly with respect to the mechanism operating thereon.

13. In a machine of the class described, the combination with a pair of folder housings forming a guideway along which can body forming blanks may be advanced of reciprocally moving bars having means thereon for engaging blanks delivered into the machine to advance them along the guideway, mechanism supported adjacent the guideway whereby the blanks will be notched and their edges turned to form hooks, a pair of clamping bars movable from and against the blanks, stop members on the clamping bars, means operating in synchronism with the advancing bars for actuating the clamping bars to first position the stop members in the path of the blanks to locate the latter properly with respect to the notching and hook forming mechanism and then for actuating the clamping bars against the blanks to retain them in fixed position, and other mechanism for actuating the notching and hook forming members while the blanks are in clamped position.

14. A machine of the class described comprising a base, a pair of folder housings mounted in parallel relation on said base and providing a guideway between them along which can body forming blanks may be advanced, means operable for advancing blanks successively through the guideway, by a series of intermittent movements, mechanism mounted on each folder housing for operation on the opposite ends of the blanks, a shaft mounted on each folder housing and having operative connection with all the operating mechanism at that side, and a drive shaft common to both of said shafts.

Signed at Seattle, Washington, this 21st day of January, 1922.

NELSON TROYER.